350-429

XR  3,659,045

United States P
Siebert 3,659,045
Apr. 25, 1972

[54] VIDICON TUBE CARRIAGE

[72] Inventor: Raymond C. Siebert, Saratoga, Calif.

[73] Assignee: Ampex Corporation, Redwood City, Calif.

[22] Filed: Jan. 5, 1970

[21] Appl. No.: 539

[52] U.S. Cl. ................................. 178/7.92, 178/7.8, 350/44, 350/187
[51] Int. Cl. .................................... H04n 5/645, G02b 7/04
[58] Field of Search ................. 178/7.8, 7.81, 7.92, DIG. 29, 178/DIG. 30; 95/45; 350/44, 187, 247, 255

[56] References Cited

UNITED STATES PATENTS

| 2,681,947 | 6/1954 | Jackson | 178/7.92 |
| 3,062,102 | 11/1962 | Martin | 95/45 |
| 3,118,354 | 1/1964 | O'Brien | 350/187 |

FOREIGN PATENTS OR APPLICATIONS

| 852,740 | 11/1960 | Great Britain | 178/DIG. 29 |

*Primary Examiner*—Benedict V. Safourek
*Assistant Examiner*—Joseph A. Orsino, Jr.
*Attorney*—Robert G. Clay

[57] ABSTRACT

To overcome backlash and looseness effects in a two-rail mounted vidicon camera tube, the tube mounting being suspended on the rails by means of three loose fitting tubular bearings and being loaded by a single spring in orthogonal directions parallel to the rails, normal to the rails in the plane of the rails, and normal to the plane of the rails, so as to take up slack and looseness in the bearings and positioning screw.

9 Claims, 4 Drawing Figures

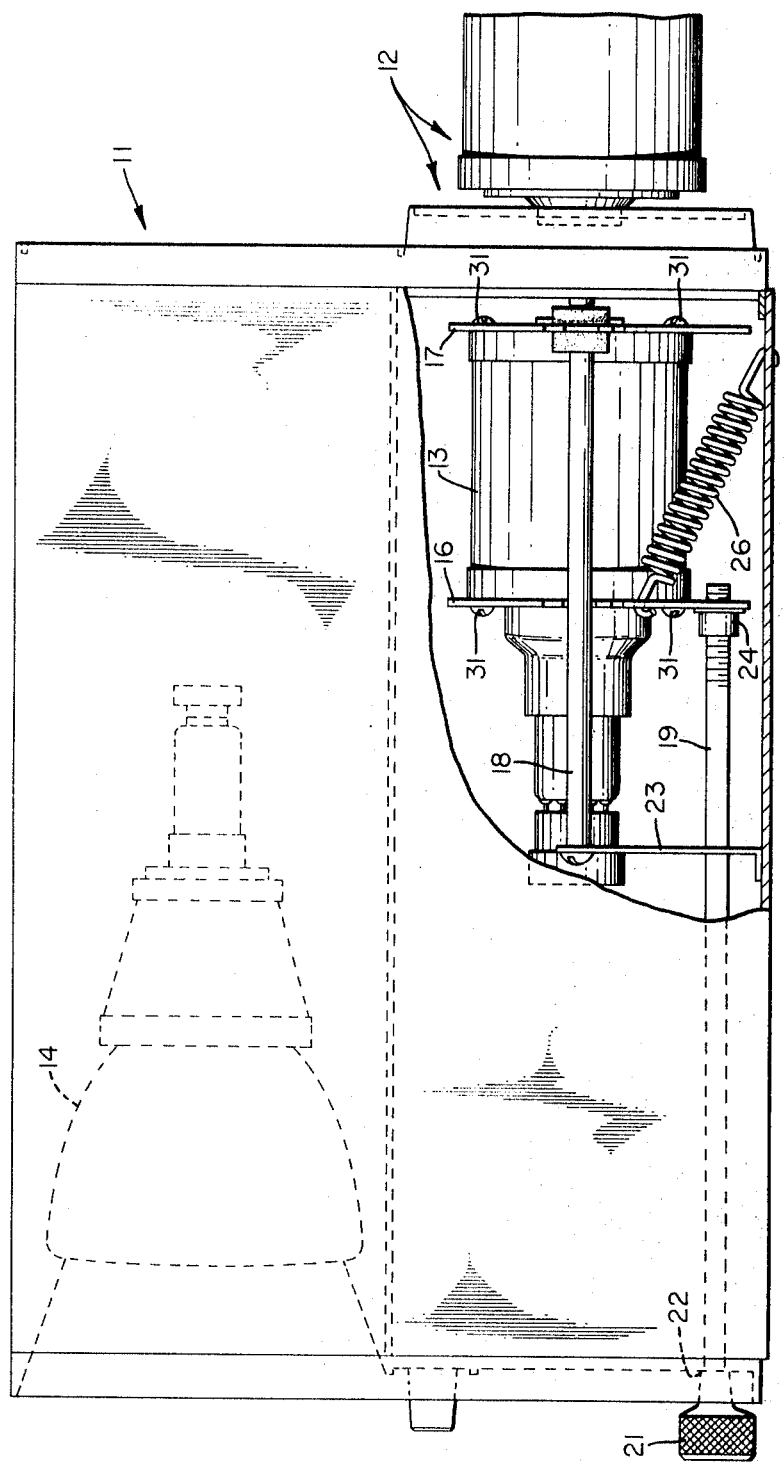

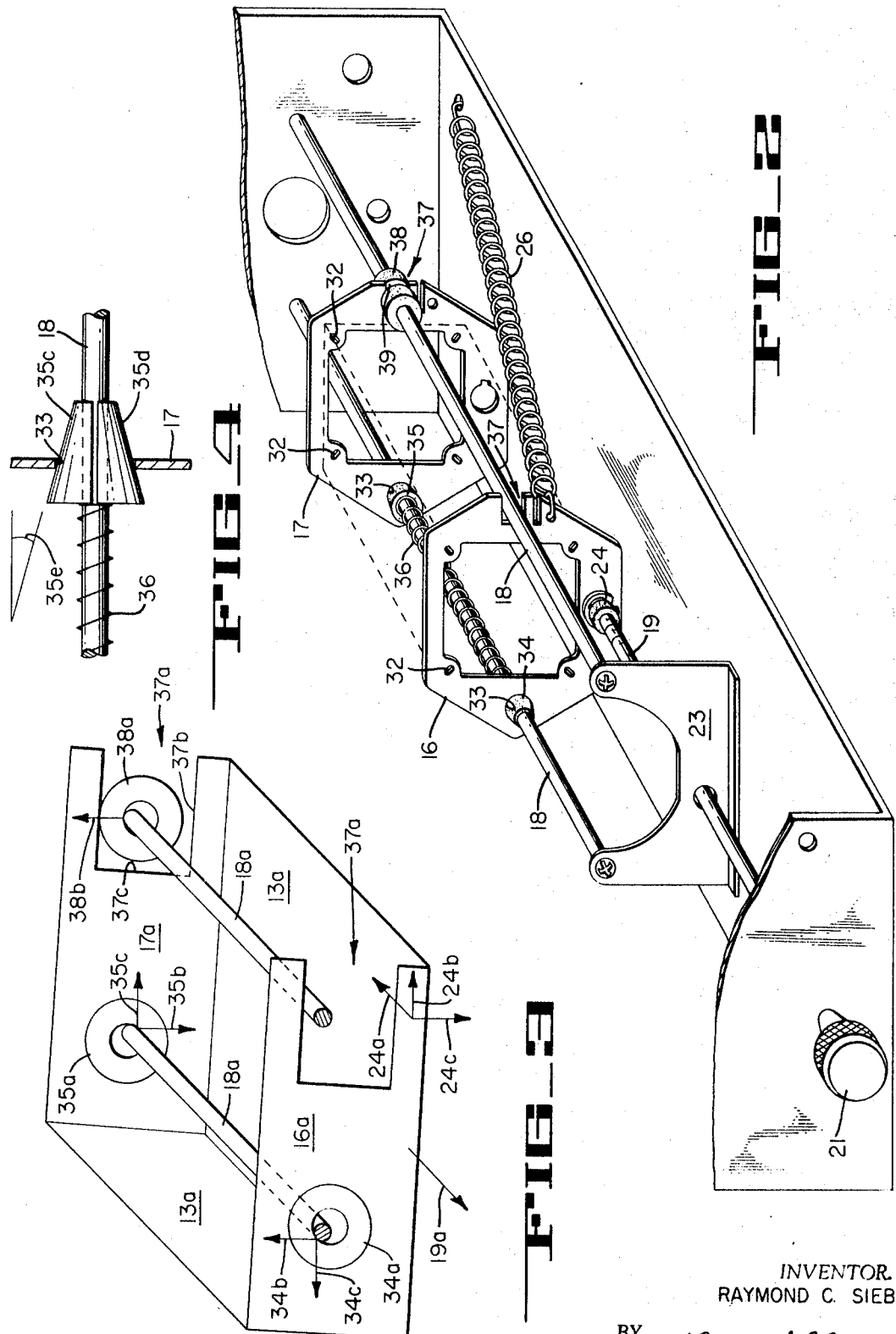

VIDICON TUBE CARRIAGE

BACKGROUND OF THE INVENTION

This invention relates to vidicon cameras, and particularly to rail mountings for the sliding vidicon tubes thereof.

Previously vidicon tubes have been mounted in cameras for sliding motion along the focal axis, so as to aid in the adjustment of focus of the camera. The sliding range does not have to be very great, and a threaded shaft is often used, bearing a thumb knob projecting for example from the rear of the camera. But there is unavoidable backlash or looseness between the threads of the shaft and the conformingly threaded position of the tube mounting and also there is unavoidable looseness between the bearing surfaces of the mounting and the rails — usually two — on which the mounting slides. Such tolerances, if allowed to influence the focus adjustment randomly, inevitably cause maladjustment and imprecise focusing. Prior means for eliminating backlash have required expensive and complex apparatus, however, and a simple and unexpensive means is very much needed.

It is therefore an object of the present invention to provide an anti-backlash tube carriage for vidicon cameras.

It is another object of the invention to provide a carriage as above described and formed of simple modular structure, relative unexpensive to manufacture and assemble.

SUMMARY OF THE INVENTION

The above and other objects are achieved in a two-rail mounted vidicon camera tube, the tube mounting being suspended on the rails by means of three loose fitting tubular bearings and being loaded by a single spring in orthogonal directions parallel to the rails, normal to the rails in the plane of the rails, and normal to the plane of the rails, so as to take up slack and looseness in the bearings and positioning screw.

DESCRIPTION OF THE DRAWINGS

FIG. 1 is a broken-away side elevation view of a vidicon camera incorporating the invention;

FIG. 2 is a perspective view of a portion of the apparatus shown in FIG. 1;

FIG. 3 is a schematic view illustrating the operation of the invention; and

FIG. 4 is a right side elevation view, to an enlarged scale, of an alternative construction of a portion of the apparatus shown in FIG. 2.

DESCRIPTION OF THE PREFERRED EMBODIMENTS

Referring now to the drawings and particularly to FIG. 1 thereof, there is shown a vidicon camera 11, including an optical lens and filter system 12 for receiving an optical image, vidicon tube 13 for receiving the optical image and transforming it into an electrical video signal, and a television picture monitor tube 14 for receiving the signal in a circuit parallel to the transmission circuit, so that the camera operator can continuously monitor the picture that he is transmitting. The remainder of the space within the camera is filled with electronics, not shown.

As is common in the camera art, when the focus of the optical lens and filter system 12 is changed to adjust for changes in distance between the subject and the camera, or for other reasons, the focal plane of the lens system is also changed along the focal axis of the camera, and the receiving vidicon tube 13 must be moved nearer to or farther from the lens in order to maintain a focused picture on the tube 14 and the other tubes that receive the transmitted video signal. Accordingly, the tube 13 is mounted between a pair of bearing plates 16, 17 for axial sliding motion on a pair of rails 18, and a threaded shaft 19 is extended from a thumb knob 21 at the rear of the camera, through a thrust bearing 22, a mounting bracket 23 for the rails, and into a threaded bushing 24 mounted on the rear mounting plate 16. A tension spring 26 urges the sliding assembly 13, 16, 17 toward the front of the camera, and the shaft and knob 19, 21 control the axial position of the tube 13.

To control backlash in the threaded portions of the shaft 19 and bushing 24, thus to accurately control the axial position of the tube 13; and to control backlash in the bearings between the plates 16, 17 and rails 18, thus to maintain an unvarying axial alignment of the tube 13, the tube mounting is constructed as follows;

First, the plates 16, 17 are manufactured as identical modular elements so as to be inexpensive and interchangeable. They are affixed solidly to the tube 13 by means of bolts 31, inserted through holes 32 in the plates, so that the tube 13 and plates 16, 17 form a rigid unitary assembly. Each of the plates 16, 17 has a large bearing hole 33 on one side embracing one of the rails 18, and a pair of truncated conical bearing sleeves 34, 35 made of low-friction material are inserted in the holes 33 to form the actual bearing element. To ensure that the sleeves 34 fit snugly within the holes 33, the sleeves are oriented to taper in opposite directions, away from one another, and are urged apart by compression spring means 36 threaded onto the associated rail 18. Furthermore, the plates 16, 17 each have a large slot 37 formed in the side opposite the hole 33, and in the slot 37 of the most forward plate 17 is mounted a right cylindrical bearing sleeve 38 made of low friction material and having a circumferential groove 39 loosely engaging one side of the slot 37. The spring 26 is then connected to the rearmost plate 16 and is angled to urge the assembly in orthogonal directions forwardly parallel to the rails 18, laterally perpendicular to the rails in the plane defined by the rails, and downwardly perpendicular to the plane of the rails.

The effect of this arrangement is illustrated more clearly in schematic FIG. 3, in which the plates 16, 17 are illustrated as rigid webs 16a, 17a, joined by rigid webs 13a to form a rigid unitary box-like construction. The sleeves 34, 35 are illustrated as bearings 34a, 35a, loosely embracing one of the rails 18a, as is necessary for sliding freedom. The sleeve 38 is illustrated as bearing 38a also loosely embracing the other rail 18a. The three orthogonal directions in which the assembly is urged by the spring 24 are illustrated by the arrows 24a, 24b and 24c, while the pull of the shaft 19 is illustrated by the arrow 19a. The downward pull of force 24c on one corner of the assembly causes it to bear through the diagonally opposed bearings 34a and 38a on the upper portions of the rails and bearings, and to tilt so as to engage the lower portions of bearing 35a and the related rail 18a. The directions of the reaction forces exerted by the rails on the bearings in this portion of the arrangement are illustrated by arrows 34b, 35b and 38b. Furthermore, the forces 19a, 24a and 24b act to provide a force couple tending to rotate the assembly in a counter-clockwise direction as seen in plan view, so that the outer portion of bearing 34a and the inner portion of bearing 35a engage the rail. The directions of the reaction forces exerted by the rails on the bearings in this portion of the arrangement are illustrated by the arrows 34c and 35c. Only the upper portion of bearing 38a engages the associated rail however, because the assembly is dimensioned so that the bearing 38a cannot engage the lower side 37b or bottom 37c of the slot 37a when the spring 26 is connected. The groove 39 of the bearing sleeve 38 does cause the sleeve to follow the sliding movement of plate 17, however. The slot 37 (37a) of plate 16 (16a) is much too large to engage the associated rail 18 in any position. Thus it will be seen that the sliding assembly is not only loaded to take up all slack and backlash in the threaded positioning shaft 19, but also is tilted to assure an unvarying alignment on the rails 18 as it slides along the rails, despite the unavoidable and necessary looseness of bearing fit on the rails.

An alternative structure for the truncated conical sleeves 34, 35 is illustrated in FIG. 4. To eliminate all of the backlash and looseness in these bearings, the sleeves may be split into a c-shape, defining two bearing arms 35c and 35d dimensioned so that the arms do not quite come together when they are assembled on the associated rail 18. Then, if the angle of taper 35e of the conical surface of the sleeve is chosen to be sufficiently small and gentle, the pressure of the spring 36 urging the sleeve into wedging engagement in hole 33 of the plate, causes the two arms 35c, 35d to also snugly engage the rail 18 without any substantial frictional pressure; and the assembly continues to slide easily on the rail without changing its alignment.

It will be understood that variations of this structure may be made without departing from the scope of the attached claims: for example, the spring 24 might be attached to the right side of front plate 17 and/or the bearing sleeve 38 might be mounted in the rear plate 16, causing tilting and skewing of the assembly to a different permanent inclination on the rails 18, but nevertheless satisfying the requirement that the resulting alignment be unvarying despite the unavoidable and necessary looseness of bearing fit on the rails.

WHAT IS CLAIMED IS:

1. An anti-backlash vidicon tube carriage comprising:
a pair of rails mounted parallel to the axis of said vidicon tube;
bearing means mounted on said vidicon tube for loosely embracing one of said rails at axially spaced points thereon, and for engaging the other of said rails orthogonally to the plane of said rails:
positioning means engaging said bearing means for moving said tube along said rails; and
loading means for urging said tube in three orthogonal directions so as to cause said bearing means to solidly engage said rails and said positioning means, thus to maintain a constant alignment of the axis of said tube as said tube is moved along said rails; and wherein
said bearing means includes a pair of bearing plates mounted at the ends of said tube, said plates each having an opening loosely embracing said one rail, and an opposed slot loosely bracketing said other rail; and
one of said slots has mounted therein a bearing sleeve embracing said other rail and engaging one side of said slot orthogonally to the plane of said rails.

2. A carriage as recited in claim 1, wherein:
said positioning means includes a rotatable shaft threaded into a conforming portion of one of said bearing plates.

3. A carriage as recited in claim 2, wherein:
said loading means includes a tension spring attached to one of said plates and urging said carriage orthogonally, parallel to said rails, perpendicular to said rails in the plane thereof, and perpendicular to the plane of said rails.

4. A carriage as recited in claim 3, wherein:
said bearing sleeve has a circumferential groove at least loosely engaging the sides of said slot but spaced from the bottom of said slot when said spring is urging said carriage in said orthogonal directions;
whereby the bearing engagement between said sleeve and said other rail is limited to the zone of the tangent generatrices of said sleeve and other rail that are adjacent said one side of said slot and that lie in a plane through the axis of said other rail and normal to the plane of the rails.

5. A carriage as recited in claim 4, wherein:
a pair of truncated conical bearing sleeve members are provided embracing said one rail within said openings in said bearing plates;
said sleeve members being oriented to taper in opposite direction; for
spring means are provided for connecting said sleeve members and for urging them in said respective opposite directions and into snug wedged engagement with said respective plates in said openings thereof.

6. A carriage as recited in claim 5, wherein:
said sleeve members are oriented with the larger ends thereof confronting; and
said spring means is a helical coil compression spring strung on said one rail and engaging said larger ends of said sleeve members and urging said sleeve members apart and into said snug wedged engagement with said respective plates in said openings thereof.

7. A carriage as recited in claim 6, wherein:
each of said truncated conical bearing sleeve members is split lengthwise into at least a c-shape of which the bearing arms are so dimensioned as to be out of engagement with one another when in place on the associated rail; and
the taper angle of each of said truncated conical sleeves is sufficiently small to cause said halves to engage said associated rail with minimal frictional pressure.

8. A carriage as recited in claim 6, wherein said carriage is incorporated in a vidicon camera assembly with said rails running from the front toward the rear thereof, and;
said rotatable shaft is journalled in a thrust bearing mounted at the rear of said camera assembly and is threaded into the rearmost one of said bearing plates; and
said tension spring is attached to said rearmost bearing plate and is arranged to urge said carriage forwardly in said camera assembly as well as downwardly and laterally away from said other rail.

9. A carriage as recited in claim 8, wherein:
said bearing sleeve is mounted in the most forward of said bearing plates in said camera assembly.

* * * * *